(12) United States Patent
Seol et al.

(10) Patent No.: US 11,973,230 B2
(45) Date of Patent: Apr. 30, 2024

(54) ELECTRODE FOR MEMBRANE-ELECTRODE ASSEMBLY AND METHOD OF MANUFACTURING SAME

(71) Applicants: Hyundai Motor Company, Seoul (KR); Kia Motors Corporation, Seoul (KR)

(72) Inventors: Su Won Seol, Gyeonggi-do (KR); Ji Hoon Yang, Gyeonggi-do (KR); Yoon Hwan Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 295 days.

(21) Appl. No.: 17/027,142

(22) Filed: Sep. 21, 2020

(65) Prior Publication Data

US 2021/0336275 A1 Oct. 28, 2021

(30) Foreign Application Priority Data

Apr. 27, 2020 (KR) ........................ 10-2020-0050580

(51) Int. Cl.
*H01M 4/86* (2006.01)
*H01M 4/88* (2006.01)
*H01M 8/1004* (2016.01)

(52) U.S. Cl.
CPC ....... *H01M 4/8626* (2013.01); *H01M 4/8828* (2013.01); *H01M 8/1004* (2013.01)

(58) Field of Classification Search
CPC . H01M 4/8626; H01M 4/8828; H01M 8/1004
See application file for complete search history.

(56) References Cited

U.S. PATENT DOCUMENTS 6,287,717 B1 9/2001 Cavalca et al.
8,580,453 B2 11/2013 Guan et al.
(Continued)

FOREIGN PATENT DOCUMENTS

| JP | 2005174620 A | * | 6/2005 |
| JP | 2006147425 A | | 6/2006 |
| KR | 2009-0027527 A | | 3/2009 |

OTHER PUBLICATIONS

JP-2005174620-A—Machine Translation (Year: 2005).*

*Primary Examiner* — Brian R Ohara
*Assistant Examiner* — Patrick Marshall Greene
(74) *Attorney, Agent, or Firm* — Fox Rothschild LLP (57) ABSTRACT

Disclosed are an electrode including a porous substrate, a membrane-electrode assembly for a fuel cell including the same and a method of manufacturing the same. In the method of manufacturing the membrane-electrode assembly, the amount of a catalyst that is loaded depending on the position is applied in a gradational manner, thus efficiently using the catalyst, thereby reducing costs owing to the use of a decreased amount of the metal catalyst. Further, the membrane-electrode assembly includes the electrode including a porous substrate, thus making it easy to select hot-pressing conditions and increasing processing efficiency. The porous substrate is hydrophobic and the pore size in the electrode is not decreased compared to conventional electrodes, thus reducing flooding and generating various operation regions. The electrode including the porous substrate can minimize electrode loss, thus improving electrode durability.

11 Claims, 3 Drawing Sheets

Electrode

Electrolyte membrane

Electrode

⇩ Hot pressing

Membrane-electrode assembly (56) References Cited

U.S. PATENT DOCUMENTS

| | | | |
|---|---|---|---|
| 2010/0098991 A1* | 4/2010 | Suzuki | H01M 8/0245 |
| | | | 429/480 |
| 2010/0221633 A1* | 9/2010 | Fujita | H01M 8/0265 |
| | | | 429/452 |
| 2012/0021329 A1* | 1/2012 | Yamauchi | H01M 8/0243 |
| | | | 429/480 |
| 2018/0351190 A1* | 12/2018 | Lee | H01M 8/1004 |
| 2021/0336279 A1* | 10/2021 | Fujii | H01M 8/1006 |

* cited by examiner

ELECTRODE FOR MEMBRANE-ELECTRODE ASSEMBLY AND METHOD OF MANUFACTURING SAME

CROSS REFERENCE TO RELATED APPLICATION

The present application claims priority based on Korean Patent Application No. 10-2020-0050580, filed on Apr. 27, 2020, the entire content of which is incorporated herein for all purposes by this reference.

TECHNICAL FIELD

The present invention relates to an electrode for a membrane-electrode assembly, which includes a porous substrate including a first region and a second region having different thicknesses when viewed in a cross-section in a thickness direction in order to vary the amount of a metal catalyst that is loaded, and to a method of manufacturing the same.

BACKGROUND OF THE INVENTION

A fuel cell is a power generation system that directly converts the chemical reaction energy of hydrogen and oxygen contained in hydrocarbon-based materials such as methanol, ethanol, and natural gas into electrical energy.

Such a fuel cell provides a clean energy source that may replace fossil fuel energy, and is capable of outputting power in various magnitudes by forming a stack by stacking unit cells, and has been receiving attention as a compact and mobile portable power source because it exhibits energy density 4-10 times that of a small lithium battery.

Typical examples of the fuel cell may include a polymer electrolyte membrane fuel cell (PEMFC) and a direct oxidation fuel cell (DOFC). A direct oxidation fuel cell using methanol as fuel is referred to as a direct methanol fuel cell (DMFC).

The polymer electrolyte membrane fuel cell is advantageous because of the high energy density and high power thereof, but requires attention to be paid to handling of hydrogen gas, and also requires an auxiliary device such as a fuel-reforming device for reforming hydrocarbon-based gas or the like to produce hydrogen, which is a fuel gas.

On the other hand, the direct oxidation fuel cell has low energy density compared to the polymer electrolyte membrane fuel cell, but is advantageous because fuel thereof is easy to handle and the operating temperature thereof is low, so it is able to operate at room temperature and does not require a fuel-reforming device.

Figure 1:
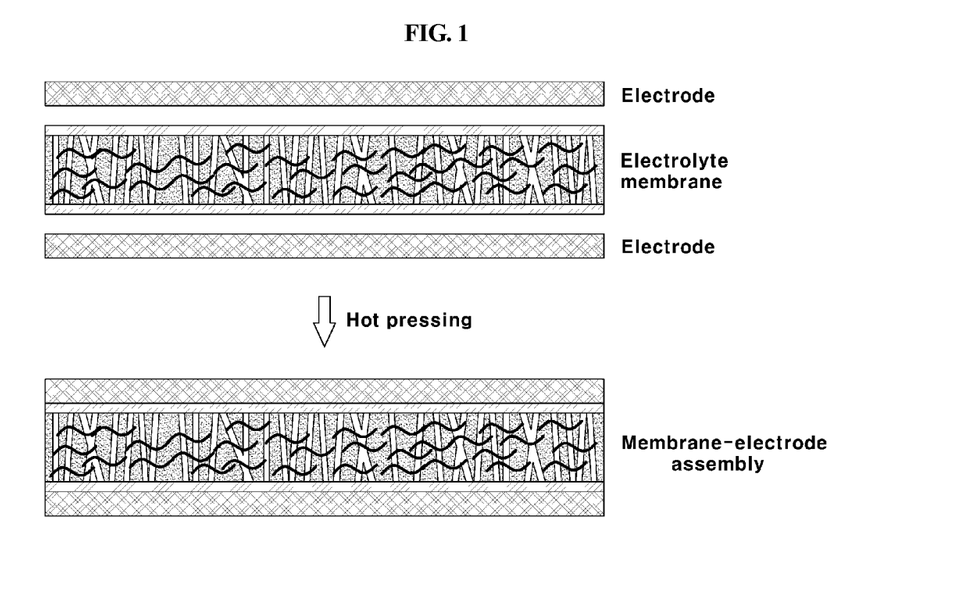
FIG. 1 is a flowchart schematically showing a conventional process of manufacturing a membrane-electrode assembly.

In such a fuel cell system, the stack that substantially generates electricity has a structure formed by stacking ones to tens of unit cells, each composed of the membrane-electrode assembly (MEA) shown in FIG. 1 and a separator (also referred to as a bipolar plate). The membrane-electrode assembly is configured such that an anode (also referred to as a "fuel electrode" or "oxidation electrode") and a cathode (also referred to as an "air electrode" or "reduction electrode") are disposed on opposite surfaces of a polymer electrolyte membrane including a proton-conductive polymer.

The principle whereby electricity is generated in the fuel cell is as follows. Fuel required for the reaction of the fuel cell is first supplied to the anode as the fuel electrode through the separator. The fuel supplied to the anode is adsorbed on a catalyst and then oxidized to generate protons and electrons, and the generated electrons are moved to the cathode, which is the oxidation electrode, along the external circuit, and the protons are transferred to the cathode through the polymer electrolyte membrane. The oxidant supplied to the cathode through the separator reacts with the protons and the electrons on the catalyst to generate heat and water while simultaneously generating electricity.

However, when manufacturing the membrane-electrode assembly shown in FIG. 1, there is a problem in that physical rigidity is weak because there is no support layer in the electrode. For example, when the electrode is coated using a decal method and then hot-pressed, a problem in which the pore size in the electrode decreases may occur, which may cause flooding. Moreover, due to the absence of a support layer in the electrode, a phenomenon in which the electrode thickness decreases depending on the operating time of the membrane-electrode assembly may occur, resulting in electrode loss. This may also cause the electrode pore structure to collapse, which may cause flooding.

Therefore, an efficient electrode for a membrane-electrode assembly, in which the amount of a metal catalyst that is loaded varies depending on the reaction region of the electrode while reducing the cause of flooding, and a method of manufacturing the same are needed.

SUMMARY OF THE INVENTION

In preferred aspects, provided is a method of manufacturing an electrode for a membrane-electrode assembly including a hydrophobic porous substrate in order to reduce the cause of flooding, an electrode for a membrane-electrode assembly manufactured by the above method, and a fuel cell including the same.

In one preferred aspect, provided is an electrode including: a porous substrate including two or more regions (e.g., a first region and a second region) having different thicknesses when viewed in a cross-section in a thickness direction. As such, the amount of the catalyst that is loaded may be varied depending on the position because the current density distribution varies depending on the position according to the power output.

The objectives of the present invention are not limited to the foregoing, and will be able to be clearly understood through the following description and to be realized by the means described in the claims and combinations thereof.

In an aspect, provided is an electrode for a membrane-electrode assembly. The electrode may include: a porous substrate having pores therein and an electrode material incorporated into the porous substrate. A region of the porous substrate when viewed in a cross-section in a thickness direction may have a different thickness than the remaining region of the porous substrate, and the region of the porous substrate when viewed in a cross-section in a thickness direction may have a different electrode density than the remaining region of the porous substrate.

The "porous substrate" as used herein may be formed of a porous material that includes plurality of shapes of pores (e.g., circular, or non-circular), holes, cavity (e.g., microcavity), labyrinth, channel or the like, whether formed uniformly or without regularity. Exemplary porous substrate may include pores (e.g., closed or open pores) within a predetermined size within a range from sub-micrometer to micrometer size, which is measured by maximum diameter of the pores.

The porous substrate may include a first region and a second region having different thicknesses when viewed in a cross-section in a thickness direction, and the thickness of the first region may be greater than the thickness of the second region.

The first region and second region may be different by at least 5, 10, 20, 25, 30, 35, 40, 45, 50, 60, 70, 80 or 90% between the thicknesses of the first and second regions. In addition, the first region and second region may be different by at least 5, 10, 20, 25, 30, 35, 40, 45, 50, 60, 70, 80 or 90% between the electrode density of the first and second regions.

The amount of a catalyst that is loaded in an electrode material incorporated into the first region may be greater than an amount of a catalyst that is loaded in an electrode material incorporated into the second region.

The amount of a catalyst that is loaded in an electrode material incorporated into the first region may be about 0.5 to 1.0 mg/cm$^2$, and the amount of a catalyst that is loaded in an electrode material incorporated into the second region may be about 0.05 to 0.5 mg/cm$^2$.

The connecting portion may connect the first region and the second region at a right angle, or obliquely.

The thickness of the first region may be about 5 to 10 μm and the thickness of the second region may be about 2 to 5 μm.

One surface of the porous substrate may be flat, and the opposite surface of the porous substrate may be irregular depending on the shape of the first region and the second region.

The porous substrate may include one or more selected from the group consisting of polytetrafluoroethylene (PTFE), ethylene/tetrafluoroethylene (ETFE), tetrafluoroethylene-hexafluoropropylene copolymer (FEP), tetrafluoroethylene-perfluoroalkylvinylether copolymer (PFA), polyimide, polyester, and polyethylene terephthalate (PET).

The pores may have a size of about 0.8 to 5.0 μm.

The first region may have a porosity of about 50 to 80% and the second region may have a porosity of about 10 to 50%.

The electrode density of the first region may be greater than the electrode density of the second region.

The electrode density of the first region may be about 0.20 to 0.35 mg/cm$^2$ and the electrode density of the second region may be about 0.05 to 0.20 mg/cm$^2$. Preferably, the electrode density of the first region is about 5, 10, 15, 20, 25, 30, 40, 50, 60, 70, 80, 90 or 100 percent or more greater than the electrode density of the second region. Preferably, the electrode density of the first region is at least about 0.01, 0.05, 0.1, 0.12 or 0.015 great than the electrode density of the second region.

In an aspect, provided is a method of manufacturing an electrode for a membrane-electrode assembly. The method may include: preparing a porous substrate; forming a porous substrate including a first region and a second region having different thicknesses when viewed in a cross-section in a thickness direction by pressing the porous substrate using a press die; and incorporating an electrode slurry on the porous substrate.

The connecting portion may connect the first region and the second region at a right angle, or obliquely.

The press die may include a protrusion having a shape complementary to the shape of the first region and the second region.

In an aspect, provided is a fuel cell. The fuel cell may include: a membrane-electrode assembly including an electrolyte membrane and an electrode disposed on each of opposite surfaces of the electrolyte membrane, and a subgasket including a center portion contacting the membrane-electrode assembly and an edge portion excluding the center portion. The edge portion may include an air inlet and a hydrogen inlet. The electrode may include a porous substrate including a first region and a second region. The first region may be thicker than the second region when viewed in a cross-section in a thickness direction, and the first region may be positioned corresponding to the air inlet and the hydrogen inlet in the edge portion of the subgasket.

In the method of manufacturing an electrode for a membrane-electrode assembly according to various exemplary embodiments of the present invention, since current density distribution varies depending on the position according to the power output in the electrode, the amount of a catalyst that is loaded depending on the position is applied in a gradational manner, thus efficiently using the catalyst and making it possible to reduce costs due to the use of a decreased amount of the metal catalyst.

Also, according to various exemplary embodiments of the present invention, the electrode for a membrane-electrode assembly includes a porous substrate including a first region and a second region having different thicknesses when viewed in a cross-section in a thickness direction, thus making it easy to select hot-pressing conditions and increasing processing efficiency. Moreover, the porous substrate is hydrophobic and the pore size in the electrode is not decreased compared to conventional electrodes, thus reducing flooding, whereby various operation regions can result. Furthermore, the electrode including the porous substrate can minimize electrode loss, thus improving electrode durability.

The effects of the present invention are not limited to the foregoing, and should be understood to include all effects that can be reasonably anticipated from the following description.

Other aspects of the invention are disclosed infra.

DETAILED DESCRIPTION

The above and other objectives, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Electrode for Membrane-Electrode Assembly

Figure 2:
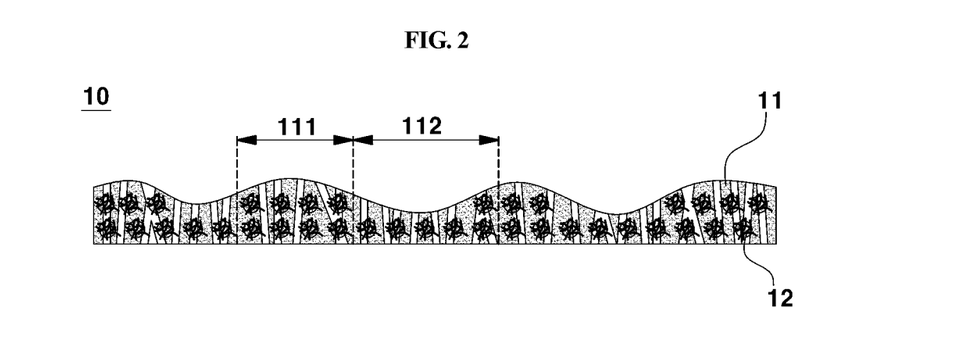
FIG. 2 is a cross-sectional view showing an exemplary electrode 10 for an exemplary membrane-electrode assembly manufactured according to an exemplary embodiment of the present invention.

FIG. 2 is a cross-sectional view showing an electrode 10 for a membrane-electrode assembly manufactured according to an exemplary embodiment of the present invention. With reference thereto, the electrode includes a porous substrate 11 having pores therein and an electrode material 12 incorporated into the porous substrate. The porous substrate may include two or more regions. A region of the porous substrate when viewed in a thickness direction may have a thickness and electrode density different from the remaining region thereof. Preferably, the porous substrate may include a first region 111 and a second region 112 having different thicknesses when viewed in a cross-section in a thickness direction. Accordingly, one surface of the porous substrate may be flat and the opposite surface thereof may be irregular depending on the shape of the first region and the second region.

The electrode for a membrane-electrode assembly may include a typical electrode useful in the present invention, for example, a cathode or an anode, and is not limited to a particular electrode. The electrode for a membrane-electrode assembly may include a porous substrate 11 having pores therein and an electrode material 12 incorporated into the pores in the porous substrate and including a catalyst. Moreover, a region of the porous substrate when viewed in a cross-section in a thickness direction may have a thickness and an electrode density different from the remaining region thereof. Preferably, the porous substrate may include a first region and a second region, having different thicknesses when viewed in a cross-section in a thickness direction, and different electrode densities may result due to the electrode material incorporated into the first region and the second region. Preferably, the electrode density of the first region may be greater than the electrode density of the second region. The electrode density indicates the amount of the electrode material included per unit volume of the first region or the second region. The electrode density of the first region may be about 0.20 to 0.35 mg/cm$^2$ and the electrode density of the second region may be about 0.05 to 0.20 mg/cm$^2$. When the electrode density of the first region is less than 0.200 g/cm$^2$, the amount of platinum that is loaded may not be sufficiently ensured. On the other hand, when the electrode density thereof is greater than about 0.35 mg/cm$^2$, the amount of platinum that is loaded may become excessive, permeation of the gaseous fuel may not be sufficient, and discharge of the generated water may not be easy. Also, when the electrode density of the second region is less than about 0.05 mg/cm$^2$, the amount of platinum that is loaded cannot be sufficiently ensured and it is difficult to attain physical rigidity. On the other hand, when the electrode density thereof is greater than about 0.20 mg/cm$^2$, the amount of platinum that is loaded may become excessive and the supply of gaseous fuel may become difficult. Thus, since the amount of the catalyst in the electrode material may be applied differently to the first region and the second region depending on the electrode density, the metal catalyst may be efficiently used, making it possible to reduce costs due to the use of a decreased amount of the metal catalyst. Furthermore, the membrane-electrode assembly for a fuel cell according to an exemplary embodiment of the present invention may include an electrode including a porous substrate, thus making it easy to select hot-pressing conditions and increasing processing efficiency. Moreover, the porous substrate may be hydrophobic and the pore size in the electrode may not be decreased compared to conventional electrodes, thus reducing flooding, whereby various operation regions may be obtained.

According to an exemplary embodiment of the present invention, the porous substrate may be a hydrophobic reinforced layer having pores therein, and may not be particularly limited so long as it is able to ensure a large number of pores therein through sufficient stretching. The porous substrate according to an exemplary embodiment of the present invention may include a typically known hydrophobic reinforced layer useful in the present invention, for example, one or more selected from the group consisting of polytetrafluoroethylene (PTFE), ethylene tetrafluoroethylene (ETFE), tetrafluoroethylene-hexafluoropropylene copolymer (FEP), tetrafluoroethylene-perfluoroalkylvinylether copolymer (PFA), polyimide, polyester, and polyethylene terephthalate (PET). The component thereof is not particularly limited, but preferably useful is PTFE, which has excellent hydrophobicity and porosity and the shape of which is easily changed.

The pores in the porous substrate may be sufficiently large so that the pores may be sufficiently maintained even after the pressing process using a press die. The pore size may preferably be about 0.8 to 5.0 When the pore size is less than about 0.8 it is difficult to incorporate the electrode slurry and to sufficiently ensure pores necessary for the electrode. On the other hand, when the pore size is greater than about 10 it is difficult to incorporate the electrode slurry due to permeation and to attain desired physical properties. Also, the porosity of the first region having the above pore size is 50 to 80%, and the porosity of the second region is about 10 to 50%. When the porosity of the first region is less than about 50%, the size of the region to be incorporated may be insufficient due to the low porosity. On the other hand, when the porosity thereof is greater than about 80%, the rigidity of the substrate may be very low. Also, when the porosity of the second region is less than about 10%, it is difficult to perform incorporation. On the other hand, when the porosity thereof is greater than about 50%, the porosity may be too high in the region in which low loading must be ensured, making it difficult to achieve sufficient incorporation.

In order to vary the amount of the catalyst that is loaded in the porous substrate, a region of the porous substrate when viewed in a cross-section in a thickness direction may have a different thickness than the remaining region thereof. Preferably, the cross-section of the porous substrate in a thickness direction may a first region and a second region having different thicknesses. In particular, the porous substrate may include a first region and a second region having different thicknesses when viewed in a cross-section in a thickness direction. Also, the portion connecting the first region and the second region may be connected by a typical connection structure useful in the present invention. For example, it may be connected at a right angle, or may be connected obliquely. The connecting portion may connect the first region and the second region at a right angle, to be inclined in a straight line, or to be inclined to form a curved shape, and is not limited to a particular connection structure.

The first region according to an exemplary embodiment of the present invention may be a portion exposed to high current, which is a relatively high current, when applying current during the operation of a membrane-electrode assembly, and may be thick in order to increase the relative amount of the metal catalyst that is loaded. On the other hand, the second region may be a portion that is exposed to low current, which is a relatively low current, when applying current during the operation of a membrane-electrode assembly, and may be thin in order to decrease the relative amount of the metal catalyst that is loaded. Particularly, the thickness of the first region may be about 5 to 10 μm. When the thickness of the first region is less than about 5 μm, the amount of the catalyst that is loaded cannot be sufficiently increased. On the other hand, when the thickness thereof is greater than about 10 μm, mass transfer resistance may occur due to the thickness, and it is difficult to perform joining to the electrolyte membrane due to excessive height difference from the second region. Also, the thickness of the second region may be about 2 to 5 μm. When the thickness of the second region is less than about 2 μm, it is impossible to ensure sufficient pores and it is difficult to attain physical rigidity. On the other hand, when the thickness thereof is greater than about 5 μm, it is difficult to incorporate the catalyst when loaded in a small amount. The amount of the catalyst that is loaded in the electrode material means the amount of the catalyst per unit area that is incorporated into pores in the porous substrate. The amount of the catalyst may be the amount of the catalyst alone, excluding the support Preferably, the amount of the catalyst that is loaded in the electrode material may be about 0.05 to 1.0 mg/cm$^2$. Meanwhile, the amount of the catalyst that is loaded in the electrode material incorporated into the first region may be greater than the amount of the catalyst that is loaded in the electrode material incorporated into the second region. Particularly, the amount of the catalyst that is loaded in the electrode material incorporated into the first region may be about 0.5 to 1.0 mg/cm$^2$ and the amount of the catalyst that is loaded in the electrode material incorporated into the second region may be about 0.05 to 0.5 mg/cm$^2$.

The loaded amount may be determined not only depending on high current/low current, but may also be determined through multiple factors depending on the exposed position according to the shape of the membrane-electrode assembly and the shape of the flow path. As necessary, it may be applied in a gradational manner over a thickness range according to the shape of the first region. In particular, in the present invention, since the current density distribution varies depending on the position according to the power output in the electrode, the amount of the catalyst that is loaded depending on the position may be applied in a gradational manner, thus efficiently using the catalyst and making it possible to reduce costs due to the use of a decreased amount of the metal catalyst.

In an exemplary embodiment of the present invention, the catalyst in the electrode material incorporated into the porous substrate is not particularly limited, so long as it participates in the oxidation of fuel and the reduction of the oxidant and may thus be used as a catalyst. The catalyst included in the electrode material according to an exemplary embodiment of the present invention may include a typically known catalyst useful in the present invention, for example, a platinum-based catalyst. The platinum-based catalyst may include one or more catalysts selected from among platinum, ruthenium, osmium, platinum-ruthenium alloy, platinum-osmium alloy, platinum-palladium alloy and platinum-M alloy (in which M is a transition metal selected from the group consisting of Ga, Ti, V, Cr, Mn, Fe, Co, Ni, Cu, Zn, Sn, Mo, W, Rh, Ru and combinations thereof). A specific example thereof may include at least one or more selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni and Pt/Ru/Sn/W.

Such a metal catalyst may be used alone (black), and may be used in the form of being supported on a support. The support may include one or more of carbon-based materials such as graphite, Denka black, Ketjen black, acetylene black, carbon nanotubes, carbon nanofibers, carbon nanowires, carbon nanoballs or activated carbon, or one or more inorganic fine particles such as alumina, silica, zirconia, titania, and the like. Preferably, the support may include the carbon-based material. When the noble metal supported on the support is used as a catalyst, a commercially available catalyst may be used, or a noble metal supported on the support may be prepared and used. Since the process of supporting the noble metal on the support is widely known in the art and may be easily understood by those skilled in the art, a detailed description thereof is omitted.

The electrode may further include a binder resin in order to increase the adhesion of the catalyst and transfer the proton. The binder resin preferably may include a polymer resin having proton conductivity, or particularly include a polymer resin having, at the side chain thereof, a cation exchange group selected from the group consisting of a sulfonic acid group, a carboxylic acid group, a phosphoric acid group, a phosphonic acid group and derivatives thereof. Preferably, the binder resin may suitably include one or more proton-conductive polymers selected from among a fluorine polymer, a benzimidazole polymer, a polyimide polymer, a polyetherimide polymer, a polyphenylene sulfide polymer, a polysulfone polymer, a polyethersulfone polymer, a polyether ketone polymer, a polyether ether ketone polymer and a polyphenylquinoxaline polymer, or particularly may include one or more proton-conductive polymers selected from among poly(perfluorosulfonic acid), poly(perfluorocarboxylic acid), tetrafluoroethylene-fluorovinylether copolymer having a sulfonic acid group, defluorinated polyether ketone sulfide, aryl ketone, poly(2,2'-m-phenylene)-5,5'-bibenzimidazole and poly(2,5-benzimidazole).

H in the ion exchange group at the side chain end of the proton-conductive polymer may be substituted with Na, K, Li, Cs or tetrabutylammonium. Upon preparing a catalyst composition, when H in the ion exchange group at the side chain end is substituted with Na, NaOH may be used, and when H is substituted with tetrabutylammonium, tetrabutylammonium hydroxide may be used. K, Li or Cs may be substituted using an appropriate compound. This substitution method is widely known in the art, and thus a detailed description thereof is omitted.

The binder resin may be used alone or in a mixture, and may be optionally used together with a non-conductive polymer for the purpose of further increasing adhesion to the polymer electrolyte membrane. The amount thereof may be appropriately adjusted depending on the end use. The non-conductive polymer may be one or more selected from the group consisting of polytetrafluoroethylene (PTFE), tetrafluoroethylene-hexafluoropropylene copolymer (FEP), tetrafluoroethylene-perfluoroalkylvinylether copolymer (PFA), ethylene/tetrafluoroethylene (ETFE), ethylene chlorotrifluoroethylene copolymer (ECTFE), polyvinylidene fluoride, polyvinylidene-fluoride/hexafluoropropylene copolymer (PVdF-HFP), dodecylbenzenesulfonic acid and sorbitol.

The electrode may further include a conductor. The conductor may include a typical conductor useful in the present invention, for example, carbon black, conductive graphite, ethylene black, graphene and the like, and is not limited to a particular component.

Method of Manufacturing Electrode for Membrane-Electrode Assembly

Figure 3:
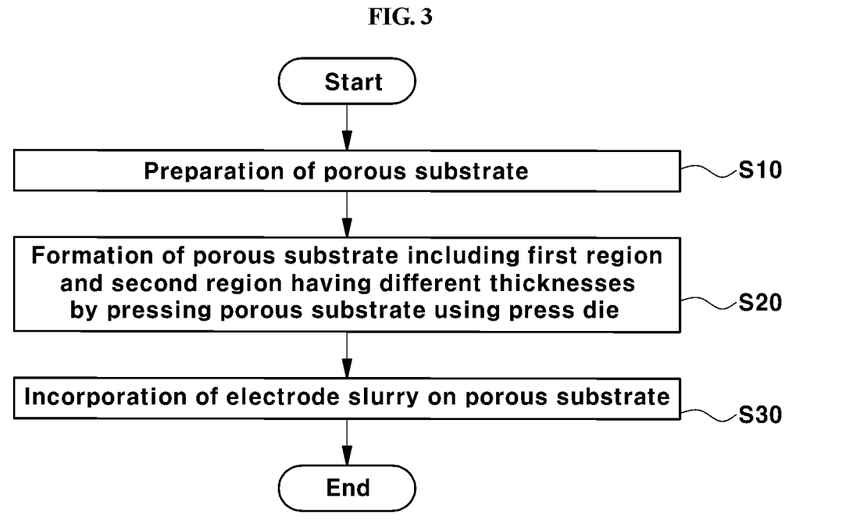
FIG. 3 is a flowchart showing an exemplary process of manufacturing an exemplary electrode for a membrane-electrode assembly according to an exemplary embodiment of the present invention.

FIG. 3 is a flowchart showing a process of manufacturing an exemplary electrode for an exemplary membrane-electrode assembly according to an exemplary embodiment of the present invention. For example, the method includes preparing a porous substrate (S10), forming a porous substrate including a first region and a second region having different thicknesses when viewed in a cross-section in a thickness direction by pressing the porous substrate using a press die (S20), and incorporating an electrode slurry on the porous substrate (S30).

Figure 4:
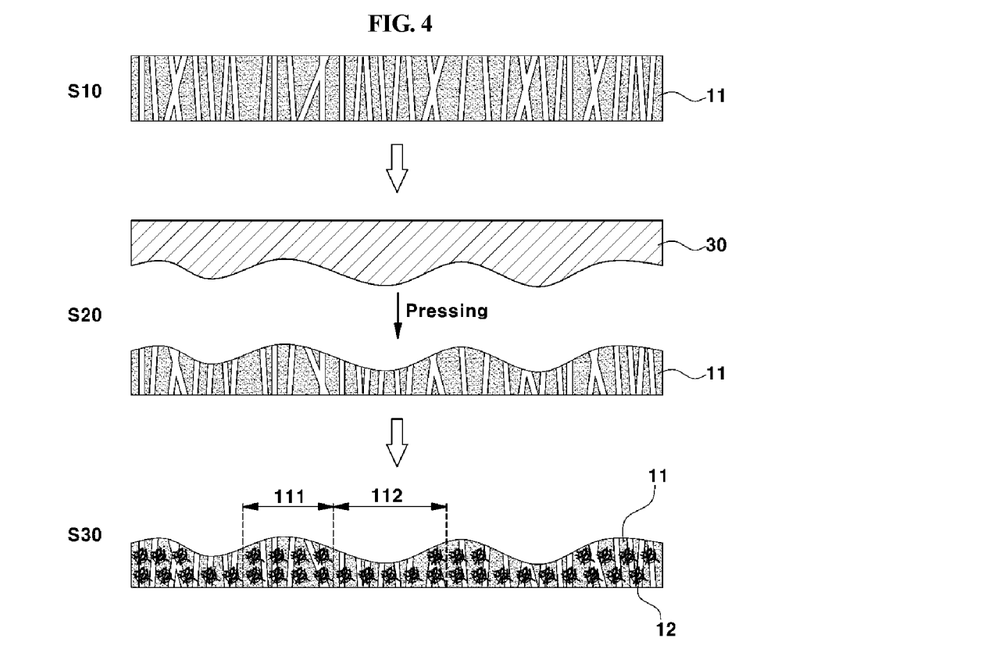
FIG. 4 sequentially shows the preparation of a porous substrate, pressing and incorporation of an electrode slurry in the flowchart of FIG. 3.

As shown in FIG. 4, in the preparing the porous substrate (S10), the porous substrate may be a hydrophobic reinforced layer having pores therein, and is not particularly limited, so long as it is able to ensure a large number of pores therein through sufficient stretching. The matters related to the first region and the second region included in the porous substrate, having different components and thicknesses, may be different from or the same as those described above.

As shown in FIG. 4, in the forming the porous substrate including the first region and the second region (S20), the press die is not particularly limited, so long as it is able to form first and second regions in the porous substrate. The press die may be made of a metal. The press die may be formed with an embossed and engraved pattern so that the first region and the second region may be formed through etching by acid treatment, anodizing, rolling using a plastic substrate having a predetermined pattern, plasma treatment, sandpapering or sand blasting, and preferably includes a protrusion having a shape complementary to the portion connecting the first region and the second region. The press die preferably may include a metal selected from the group consisting of Al, Ni, Cu and Fe, and may be formed with an embossed and engraved pattern through etching using an acid solution. The patterning process through acid solution treatment may form a micrometer-sized fine pattern compared to a conventional patterning process. After preparation of the press die, the press die may be pressed on the prepared porous substrate to form first and second regions having different thicknesses. For example, the press die may be preferably pressed on the porous substrate at a temperature of about 80 to 200° C. under a pressure of about 5 to 100 kgf/cm$^2$ for about 1 to 5 min. When the temperature, pressure or time applied to form the first and second regions in the porous substrate is less than the corresponding lower limit above, the shape formed on the porous substrate may be non-uniform. On the other hand, when the temperature, pressure or time exceeds the corresponding upper limit above, the shape of the porous substrate may collapse, and processing efficiency may not be sufficient, which is undesirable. The temperature, pressure and time for forming the porous substrate including the first region and the second region may be appropriately adjusted, but are most optimal under the above conditions, as can be confirmed experimentally.

In addition, as shown in FIG. 4, in the incorporating the electrode slurry on the porous substrate (S30), the electrode slurry may be incorporated on the porous substrate including the first region and the second region, thus manufacturing an electrode for a membrane-electrode assembly. The electrode slurry may include a catalyst, a binder, a conductor, and a solvent. A description of the catalyst, binder and conductor may be the same as or different from the above description. The solvent may include alcohol, such as ethanol, isopropyl alcohol, ethyl alcohol, n-propyl alcohol, butyl alcohol, etc., and preferably, alcohol such as 2-propanol, ethanol, and isopropyl alcohol is used together with water. When the viscosity of the solvent decreases, the flowability thereof may increase, and thus the amount thereof is preferably adjusted in a preferred range for uniform coating. Generally, a binder may be used in the form of an aqueous dispersion dispersed in water or a mixed solvent of water and alcohol. The components of the electrode slurry may be uniformly mixed through mechanical mixing or ultrasonic mixing.

Moreover, the process of incorporating the electrode slurry may be performed in a manner in which the electrode slurry is applied on the porous substrate and incorporated thereon. In particularly, depending on the viscosity, any process selected from among screen printing, spray coating, doctor-blade coating, gravure coating, dip coating, silk screening, painting, and slot-die coating may be performed, but the present invention is not limited thereto. For example, a screen-printing process may be performed. Preferably, the process of applying and incorporating the electrode slurry on the porous substrate may be performed 1 to 10 times, and preferably 1 to 5 times. When the number of coating processes is greater than 7, the amount that is incorporated may become excessive.

Fuel Cell

A fuel cell according to an exemplary embodiment of the present invention may include a membrane-electrode assembly including an electrolyte membrane and electrodes disposed on opposite surfaces of the electrolyte membrane, and a subgasket including a center portion contacting the membrane-electrode assembly and an edge portion excluding the central portion.

The electrolyte membrane according to an exemplary embodiment of the present invention is not particularly limited, so long as it performs an ion exchange function that moves the protons generated from the catalyst on the anode of the present invention to the catalyst on the cathode.

The electrolyte membrane is a typically known electrolyte membrane useful in the present invention, and a polymer having high proton conductivity, for example, any polymer resin having, at the side chain thereof, a cation exchange group selected from the group consisting of a sulfonic acid group, a carboxylic acid group, a phosphoric acid group, a phosphonic acid group and derivatives thereof may be used. Preferably, the polymer resin may include one or more proton-conductive polymers selected from among a fluorine polymer, a benzimidazole polymer, a polyimide polymer, a polyetherimide polymer, a polyphenylene sulfide polymer, a polysulfone polymer, a polyethersulfone polymer, a polyether ketone polymer, a polyether ether ketone polymer, a polyphenylquinoxaline polymer. Particularly, the polymer may include one or more selected from among poly(perfluorosulfonic acid), poly(perfluorocarboxylic acid), tetrafluoroethylene-fluorovinylether copolymer having a sulfonic acid group, defluorinated polyether ketone sulfide, aryl ketone, poly(2,2'-m-phenylene)-5,5'-bibenzimidazole, and poly(2,5-benzimidazole). Also, H in the ion exchange group at the side chain end of the proton-conductive polymer may be substituted with one or more ions selected from a monovalent ion such as sodium, potassium and cesium, and a tetrabutylammonium ion. When the ion exchange group at the side chain end is substituted in this way, thermal stability may increase, and thus, upon manufacturing a membrane-electrode assembly included in a fuel cell, even when heat treatment is performed at a high temperature of about 200° C. or greater during the hot rolling process, there is no concern of deterioration of the polymer resin, decreased proton conductivity, or decreased lifetime of the fuel cell. Moreover, the polymer electrolyte membrane having an ion exchange group substituted with ions such as sodium, potassium, cesium or tetrabutylammonium, for example, a sodium-form polymer electrolyte membrane substituted with a sodium ion, is resulfonated during the subsequent sulfuric acid treatment of a catalyst layer and is converted into a proton form. However, the electrolyte membrane according to an exemplary embodiment of the present invention is not limited to the above-described types, and polyperfluorosulfonic acid having excellent ion conductivity is preferably used.

The electrode for a membrane-electrode assembly according to an exemplary embodiment of the present invention may be the same as or different from the above description. The electrolyte membrane and the electrode for a membrane-electrode assembly may be first prepared, after which the membrane-electrode assembly according to an exemplary embodiment of the present invention may be manufactured. For example, the electrode for a membrane-electrode assembly may be disposed on each of opposite surfaces of the electrolyte membrane and may be transferred using heat and pressure. The electrode may be hot-rolled and transferred onto the electrolyte membrane at a temperature ranging from the glass transition temperature of the electrolyte membrane that is used to a temperature 100° C. greater than the glass transition temperature under a pressure of about 5 to 20 kgf/cm$^2$, and or particularly about 5 to 50 kgf/cm$^2$. When the temperature and pressure fall in the above ranges, the electrode may be efficiently transferred. When the temperature or pressure falls out of the corresponding range above, the electrode may be incompletely transferred or may be excessively dense, making it difficult to introduce and remove reactants. Moreover, there is concern about physical deformation of the electrolyte membrane. However, the method of the present invention is not particularly limited to the above method, and may be used to manufacture a membrane-electrode assembly so long as it is a typical method useful in the present invention.

After the membrane-electrode assembly is manufactured, a subgasket may be disposed on a side edge region of the membrane-electrode assembly to seal the side end of the membrane-electrode assembly, thereby manufacturing a fuel cell.

The subgasket according to an exemplary embodiment of the present invention is not particularly limited, so long as it is able to prevent the discharge of water from the electrolyte membrane out of the fuel cell while exhibiting desirable main functions, such as improving the durability of the fuel cell.

The shape of the subgasket may be changed depending on a typical shape that may be used in the present invention, for example, the shape of a membrane-electrode assembly. The shape may be at least one shape selected from the group consisting of a rectangular shape, a square shape, an oval shape, a circular shape and combinations thereof, and is not limited to any particular shape. Accordingly, the shape of the edge portion may also vary depending on the center portion. The membrane-electrode assembly may include the porous substrate including the first region and the second region, having different thicknesses when viewed in a cross-section in a thickness direction, and preferably, the thickness of the first region may be greater than the thickness of the second region. Therefore, the first region may be positioned corresponding to an air inlet and a hydrogen inlet in the edge portion of the subgasket.

Figure 5A:
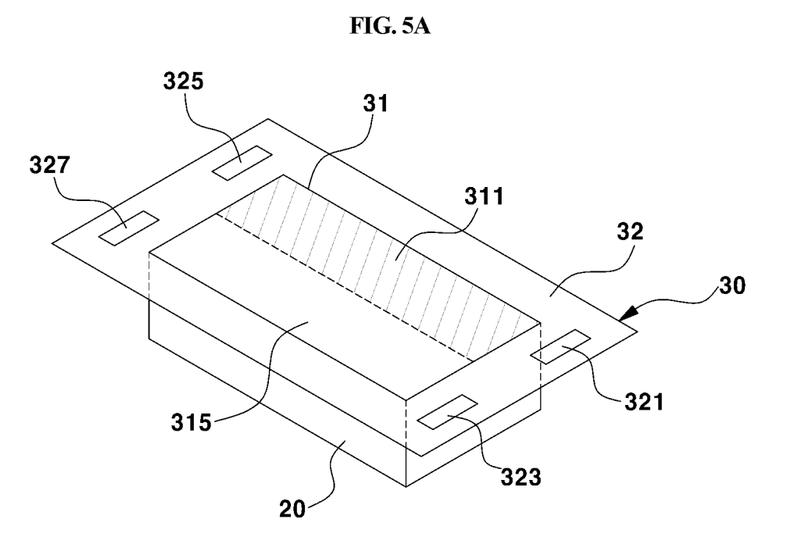
FIGS. 5A and 5B are a perspective view and a top plan view, respectively, showing an exemplary subgasket and an exemplary membrane-electrode assembly, which are joined according to an exemplary embodiment of the present invention.
Figure 5B:
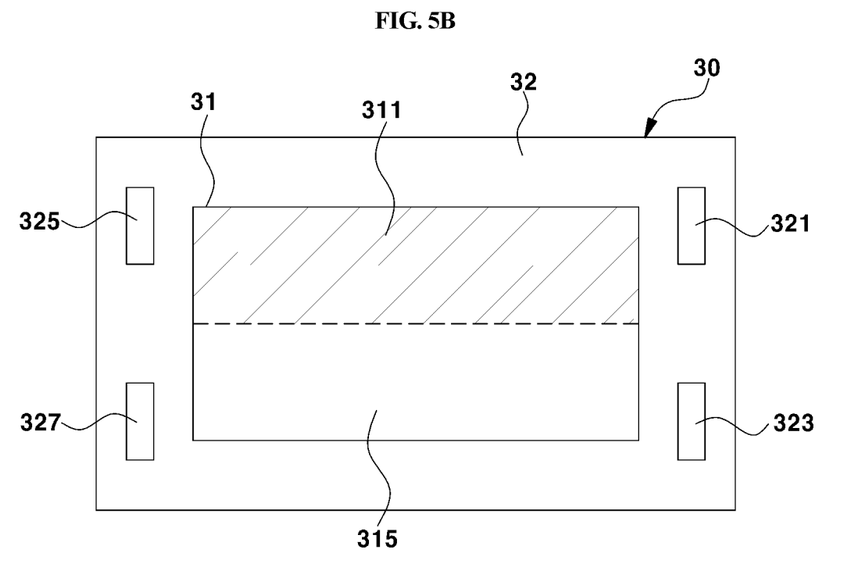

FIG. 5A is a perspective view showing the subgasket and the membrane-electrode assembly, which are joined according to an exemplary embodiment of the present invention, and FIG. 5B is a top plan view thereof. For example, the subgasket 30 may include a center portion 31 contacting the membrane-electrode assembly 20 according to an exemplary embodiment of the present invention and an edge portion 32 excluding the center portion, and the edge portion 32 may include an air inlet 321, an air outlet 323, a hydrogen inlet 325, and a hydrogen outlet 327. An adjacent portion 311, adjacent to the air inlet and the hydrogen inlet, and a non-adjacent portion 315 may be present in the center portion 30, and the first region 111 in the porous substrate included in the electrode 10 for a membrane-electrode assembly may be present corresponding to the adjacent portion 311 in a thickness direction. The positions of the air inlet 321 and the hydrogen inlet 325 are not limited, so long as they are typical positions applicable in the present invention depending on the shape of the edge portion 32, which may change. For example, the air inlet 321 and the hydrogen inlet 325 may be disposed in a facing position, a diagonal position, a corner-to-corner position, and the like. Accordingly, the adjacent portion 311 may also be variably changed in a thickness direction corresponding thereto, and is not limited to any particular position.

Particularly, in the method of manufacturing the electrode for a membrane-electrode assembly according to an exemplary embodiment of the present invention, the current density distribution may vary depending on the position according to the power output in the electrode, and thus the amount of the catalyst that is loaded depending on the position may be applied in a gradational manner, thus efficiently using the catalyst and making it possible to reduce costs due to the use of a decreased amount of the catalyst. Moreover, the electrode for a membrane-electrode assembly thus manufactured may include the porous substrate including the first region and the second region, having different thicknesses, thus making it easy to select hot-pressing conditions and increasing processing efficiency. Since the porous substrate is hydrophobic and the pore size in the electrode is not decreased compared to existing electrodes, flooding can be reduced, whereby various operating regions can result. Furthermore, since the electrode including the porous substrate can minimize electrode loss, electrode durability can be improved.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode for a membrane-electrode assembly, comprising:
   a porous substrate having pores therein; and
   an electrode material located in the pores of the porous substrate,
   wherein a region of the porous substrate when viewed in a cross-section in a thickness direction has a different thickness than a remaining region of the porous substrate,
   wherein the region of the porous substrate when viewed in the cross-section in the thickness direction has a different electrode density than the remaining region of the porous substrate,
   wherein the porous substrate comprises one or more selected from the group consisting of polytetrafluoroethylene (PTFE), ethylene/tetrafluoroethylene (ETFE), tetrafluoroethylene-hexafluoropropylene copolymer (FEP), tetrafluoroethylene-perfluoroalkylvinylether copolymer (PFA), polyimide, polyester, and polyethylene terephthalate (PET),
   wherein the electrode material comprises a metal catalyst,
   wherein the porous substrate comprises a first region and a second region, having different thicknesses when viewed in the cross-section in the thickness direction,
   wherein a thickness of the first region is greater than a thickness of the second region,
   wherein one surface of the porous substrate is flat and an opposite surface of the porous substrate is irregular depending on a shape of the first region and the second region,
   wherein the thickness of the first region is 5 to 10 μm and the thickness of the second region is 2 to 5 μm, and
   wherein a loaded amount (mg/cm$^2$) of the metal catalyst in the electrode material is applied in a gradational manner over the thickness of the first region.

2. The electrode of claim 1, wherein the one surface of the porous substrate that is flat is configured to contact an electrolyte membrane of the membrane-electrode assembly.

3. The electrode of claim 1, wherein the loaded amount of the metal catalyst that is loaded in the electrode material incorporated into the first region is greater than the loaded amount of the metal catalyst that is loaded in the electrode material incorporated into the second region.

4. The electrode of claim 1, wherein the loaded amount of the metal catalyst that is loaded in the electrode material incorporated into the first region is 0.5 to 1.0 mg/cm$^2$, and the loaded amount of the metal catalyst that is loaded in the electrode material incorporated into the second region is 0.05 to 0.5 mg/cm$^2$.

5. The electrode of claim 1, wherein a connecting portion connects the first region and the second region at a right angle or obliquely.

6. The electrode of claim 1, wherein the pores have a size of 0.8 to 5.0 μm.

7. The electrode of claim 1, wherein the first region has a porosity of 50 to 80% and the second region has a porosity of 10 to 50%.

8. The electrode of claim 1, wherein an electrode density of the first region is greater than an electrode density of the second region.

9. The electrode of claim 8, wherein the electrode density of the first region is 0.20 to 0.35 mg/cm2 and the electrode density of the second region is 0.05 to 0.20 mg/cm2.

10. A fuel cell, comprising:
    a membrane-electrode assembly comprising an electrolyte membrane and an electrode disposed on each of opposite surfaces of the electrolyte membrane; and
    a subgasket comprising a center portion contacting the membrane-electrode assembly and an edge portion excluding the center portion,
    wherein the electrode comprises a porous substrate having pores therein, and an electrode material located in the pores of the porous substrate,
    wherein a region of the porous substrate when viewed in a cross-section in a thickness direction has a different electrode density than a remaining region of the porous substrate,
    wherein the porous substrate comprises one or more selected from the group consisting of polytetrafluoroethylene (PTFE), ethylene/tetrafluoroethylene (ETFE), tetrafluoroethylene-hexafluoropropylene copolymer (FEP), tetrafluoroethylene-perfluoroalkylvinylether copolymer (PFA), polyimide, polyester, and polyethylene terephthalate (PET),
    wherein the electrode material comprises a metal catalyst,
    wherein the edge portion comprises an air inlet and a hydrogen inlet,
    wherein the porous substrate comprises a first region and a second region, the first region being thicker than the second region when viewed in the cross-section in the thickness direction,
    wherein one surface of the porous substrate is flat and an opposite surface of the porous substrate is irregular depending on a shape of the first region and the second region,
    wherein the thickness of the first region is 5 to 10 μm and the thickness of the second region is 2 to 5 μm, and
    wherein a loaded amount (mg/cm$^2$) of the metal catalyst in the electrode material is applied in a gradational manner over the thickness of the first region.

11. The fuel cell of claim 10, wherein the one surface of the porous substrate that is flat is configured to contact the electrolyte membrane of the membrane-electrode assembly.

\* \* \* \* \*